Nov. 23, 1926.

O. B. WALTERS 1,607,654

ROAD SCRAPING AND MAINTAINING MACHINE

Filed Nov. 3, 1924    2 Sheets-Sheet 1

Inventor
O. B. Walters,

By Arthur H. Sturges,
Attorney

Nov. 23, 1926.   1,607,654
O. B. WALTERS
ROAD SCRAPING AND MAINTAINING MACHINE
Filed Nov. 3, 1924   2 Sheets-Sheet 2
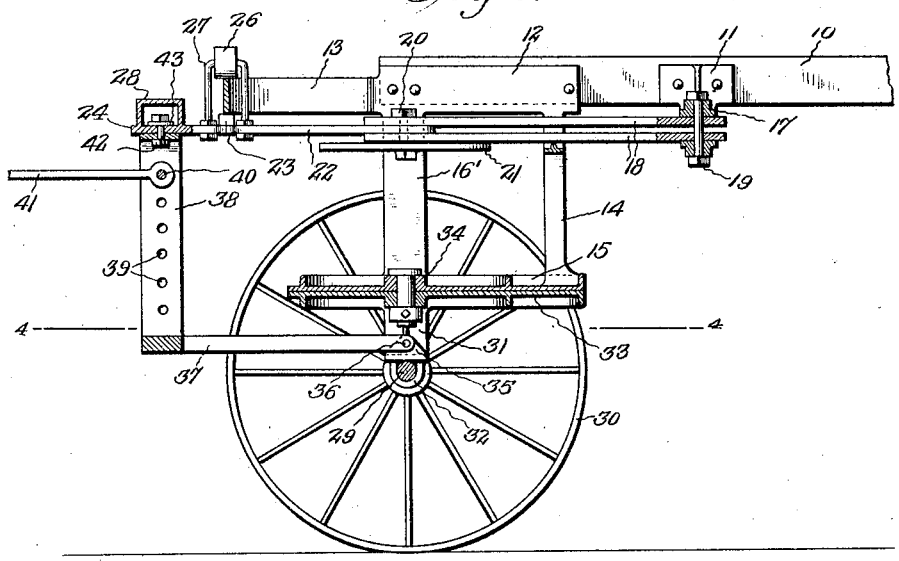

Patented Nov. 23, 1926.

1,607,654

UNITED STATES PATENT OFFICE.

ODIN B. WALTERS, OF COUNCIL BLUFFS, IOWA.

ROAD SCRAPING AND MAINTAINING MACHINE.

Application filed November 3, 1924. Serial No. 747,605.

The present invention relates to road scraping and maintaining machines, and has more particular reference to an improved structure of short turning gear adapted to support the forward end of the machine and brace the same and admit of the short turning thereof.

An object of the present invention is to provide a short turning gear which is adapted to operate within the usual limits of turning gear so that a machine equipped with the turning gear may follow a tractor or the like, and which is further provided with a supplemental structure admitting of a secondary shifting or turning of the gear, so that the wheels may be swung completely beneath the frame of the machine, and may thus follow a tractor or the like when turning abruptly or when backing, or during other maneuvering of the machine and draft device wherein extremely short turning is required.

Another object of the invention is to provide a short turning gear with draft means arranged between the frame and the axle bolster so that the draft may be unequally distributed between the axle and the frame and to thus impose the strain more or less upon the frame, particularly when scrapers and other dragging devices are carried by the frame.

A further object of the invention is to provide a combined short turning gear and draft device which may be readily installed upon machine frames already constructed and designed without materially altering the same and which may be readily embodied in the fore part of the machine frame.

The invention still further aims at the provision of an improved turning and draft structure adapted to be mounted on a relatively long machine frame and which is arranged to not only provide for the proper draft connections through the frame to implements connected to the frame, but also to permit the relatively short turning of the long frame or machine in a narrow road or the like.

With the foregoing and other objects in view, the invention will be more fully described hereinafter, and will be more particularly pointed out in the claims appended hereto.

In the drawings, wherein like symbols refer to like or corresponding parts throughout the several views.

Figure 3 is a longitudinal vertical section taken substantially centrally through the device on the forward end of the frame, and

Figure 4 is a horizontal section taken substantially on the line 4—4 of Figure 3 and showing the front axle and tongue connection.

Figure 1:
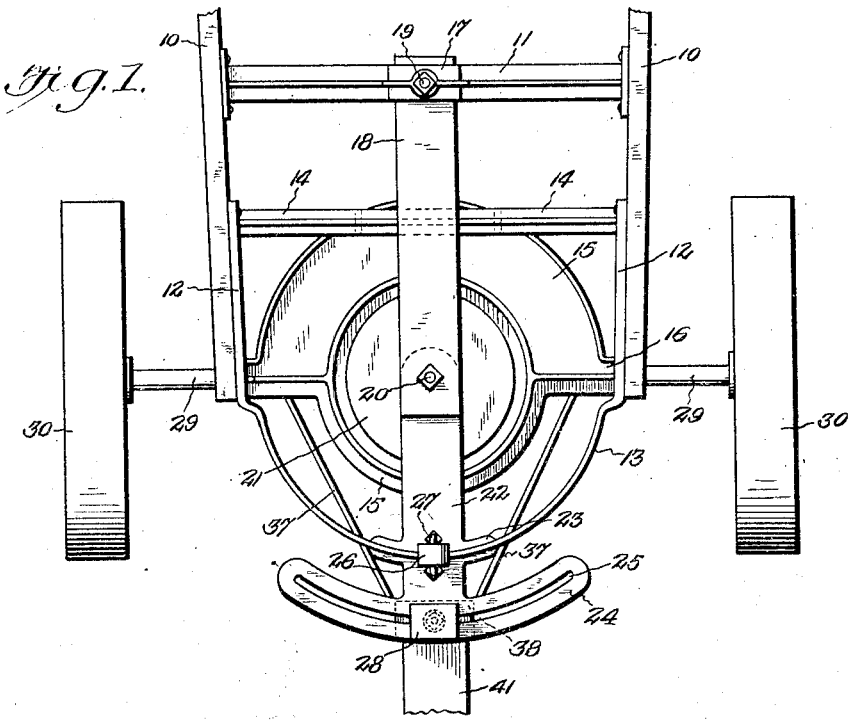
Figure 1 is a fragmentary top plan view of the forward end of the machine frame having the combined draft and short turning gear device of this invention applied thereto.
Figure 2:
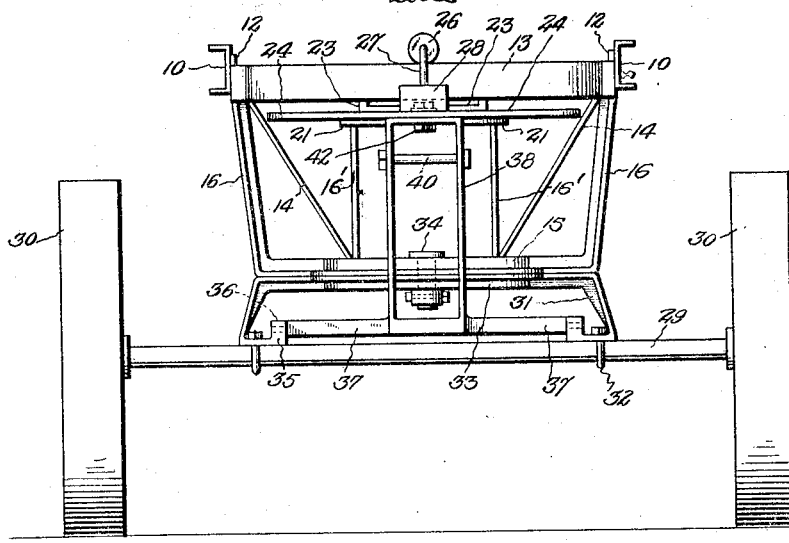
Figure 2 is a front elevation of the same.

Referring to the drawings 10 designates the frame shown in the form of a pair of side rails connected near their forward ends by a cross brace 11.

The device of this invention is adapted to be secured between the forward extremities of the side rails of the frame 10 and the body part of the device comprises a casting of substantially basket shape having side portions 12 adapted to fit against the inner opposite sides of the rails of the frame and which are joined together at their forward ends by a semi-circular track or brace 13 which is bowed forwardly from the frame 10. The rear ends of the side portions 12 are connected together by a downwardly arched brace 14 which supports the upper member 15 of a fifth wheel structure spaced considerably below the horizontal plane of the frame 10. The upper member 15 is connected by the upstanding lateral arms 16 to the forward ends of the side portions 12, and any other suitable bracing may be resorted to between these side members 12 and the upper fifth wheel member 15. The structure thus formed is substantially basket shape and is secured by means of the side portions 12 to the frame 10. The cross brace 11 may have an intermediate socket 17 to receive the rear ends of a pair of draft links 18 therein, the links being pivoted upon a bolt or pin 19 secured through the cross brace 11 and being of suitable dimension and material to take up the draft of the frame and any implements which may be connected to the same.

The forward ends of the draft links 18 are connected by a pivot bolt 20 to the upper web or plate 21 of the basket casting, the plate 22 being mounted on arms 16′, which rise from the member 15 at opposite sides of the axis of the bolt 20, and the bolt 20 pivotally secures the inner end of a draw bar 22 between the forward extremities of the draft links 18 and serves as a pivot upon which the draw bar 22 may swing. The bolt 20 is located at the center of the arc upon which the rail 13 is curved so that the draw bar 22 extends truly radially with respect to the curved track 13 and the pivot or axis 20. The draw bar 22 is provided with ears 23 which extend in an edgewise direction from the opposite edges of the draw bar and engage beneath the track 13 for holding the draw bar against twisting beneath the track. The draw bar 22 extends forwardly from the track 13 and is provided with an arcuate T-head 24 concentric to the track 13 and provided with an arcuate longitudinal slot 25 which is also concentric to the track 13.

The draw bar 22 is supported upon the track 13 by a roller 26 carried in a bracket 27 of U-shape having its arms extending downwardly at the inner and outer sides of the track 13 and secured by nuts or the like through the draw bar 22. The bracket 27 constitutes a hanger for supporting the forward or outer end of the draw bar and the roller 26 is adapted to traverse the track and support the draw bar in all of the various adjusted positions at the front and at the opposite sides of the basket casting. The T-head 24 is reinforced by a hood or housing 28 preferably cast integral with the head 24 and which bridges the slot 25 at a point intermediate the ends of the head 24. The hood 28 extends upwardly over the slot for a purpose which will be hereinafter brought out.

Beneath the forward end of the frame 10 is disposed a front axle 29 carrying the front wheels 30 used in steering or guiding the frame 10. The axle 29 carries an axle bolster 31 secured by U bolts 32 or the like to the opposite end portions of the axle and which is provided with a lower fifth wheel member 33 adapted to seat beneath the basket frame. A king bolt 34 is arranged centrally through the upper and lower fifth wheel members 15 and 33 to determine the position of the axle 29 beneath the frame and to provide a central pivot about which the axle may swing. The forward opposite inturned ends of the axle bolster 31 are provided with upstanding apertured lugs 35 within which engages the outturned studs 36 of a fork 37 adapted to extend outwardly in substantially a horizontal plane from the axle bolster 31. The outer end of the fork 37 carries a vertically elongated socket 38 comprising spaced parallel bars having corresponding series of apertures 39 therein for the reception of a coupling bolt 40 which may be selectively engaged in a pair of apertures, each of which correspond in the opposite series.

The tongue or draw bar 41 is pivotally mounted on the bolt 40 between the bars and the tongue may thus be secured at the desired height in the socket so that when draft pressure is placed upon the tongue 41 such pressure is transferred through the opposite ends of the socket 38 to the frame 10 and to the axle 29. The upper end of the tongue socket 38 carries a bolt 42 slidable in the arcuate slot 25 of the T-head and provided with a supporting washer 43 arranged to transverse the upper face of the T-head 24 and thus maintain the bolt 42 from dropping down through the slot. In this manner the tongue socket 38 is supported upon the T-head, and when the tongue 41 and draft bar 22 are in longitudinal alinement with the frame 10, the head of the bolt 42 and its washer 43 are enclosed within the hood or housing 28.

The operation of the device is apparent for when the tongue 41 is drawn forwardly in a straight line the draft is exerted through the socket 38 and partly to the axle 29, but for the most part through the draft bar 22 and the draft links 18 where the entire weight or drag of the frame and its implements is taken up. When the tongue 41 is turned to one side in making a turn with the frame, the draft bar 22 swings on its pivot 20 while the roller 26 traverses the semicircular track 13. At this time the wheels 30 are swung partly beneath the frame 10 and the roller 26 is brought more or less to the limit of its movement over the rail 13. When the roller 26 is moved to one side of the track 13, and it is still desired to swing the tongue 41 in the same lateral direction, such may be accomplished by the sliding of the bolt 42 in the slot 25 of the T-head so that the axle 29 may be turned for a considerable distance beyond a right angular turn beneath the frame 10. The arrangement thus provides for the ample support of the draft bar 22 and at the same time permits of an extremely short turn of the axle 29 without sacrificing in the construction and bracing of the frame.

The nut on bolt 42 is tightened sufficiently to induce sufficient friction upon the bolt and nut for insuring the operation of the roller 26 over the bar 13 until the roller has reached the end of its track. This bolt 42 may be used to advantage where the draft is laterally or at an angle and where it is desired to maintain the steering mechanism in a straight line position.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. In a combined short turning and draft gear, a circular track, means for pivotally mounting the inner end of the draft bar upon a frame, a draft bar carried upon the forward end of the frame concentric to said pivot and having a T-head with a longitudinal slot therein concentric to the track, a roller mounted on the track and connected to the draft bar for supporting the same from the track and permitting the swinging of the draft bar to opposite sides of the frame, a tongue socket, a bolt connecting the upper end of the tongue socket to said T-head and extending in the slot thereof to admit the lateral swinging of the tongue socket beyond the limits of the swinging of the draft bar, and means for connecting the lower end of the tongue socket to the front supporting axle of the frame.

2. In a combined draft and short turning gear, a draw bar, means for pivotally connecting the inner end of the draw bar to a vehicle frame, a circular track mounted on the forward end of the frame concentric to the pivot, said draw bar having laterally projecting portions at its outer end and provided with an arcuate slot concentric with the track extending through said portions, a hanger carried by the draw bar and engaging said track, and a tongue connection having a bolt engaging in said slot to suspend the tongue socket from the draft bar and permit of the shifting of the tongue socket laterally in either direction upon the completion of the lateral swinging movement of the draft bar beneath the circular track.

3. In a combined draft and short turning gear, a frame having a pair of side rails, a cross brace secured between the side rails near their forward ends, a basket casting secured between the forward extremities of said side rails and projecting downwardly therebetween, a pair of draft links extending between said cross brace and said basket casting, said basket casting having a forwardly extending semicircular track, a draft bar pivoted to the forward ends of said links at the center of gravity of said track, a hanger on said draft bar engaging the track, said draft bar having a T-head on its outer end and a slot extending in the T-head, a tongue socket suspended form the T-head and having a bolt engaging in said slot, an axle arranged beneath the forward end of the frame and connected to the lower end of said tongue socket, and means connecting the lower end of the basket casting to the axle, said tongue slot being adapted to be swung laterally until said hanger reaches the end of the semicircular track and adapted to be further moved in said direction until said bolt reaches the end of the slot in said T-head.

4. In a combined draft and short turning gear, a draft bar, means for pivotally mounting the inner end of said draft bar upon a frame, said draft bar having lateral projections at its outer end and provided with the slot extending into said projections, and a tongue socket having a bolt on its upper end extending into said slot for suspending the tongue socket from the draft bar, said bolt being adapted to slide into the opposite ends of said slot upon the further lateral movement of the tongue socket after the draft bar is swung to its full lateral position.

In testimony whereof, I have affixed my signature.

ODIN B. WALTERS.